UNITED STATES PATENT OFFICE.

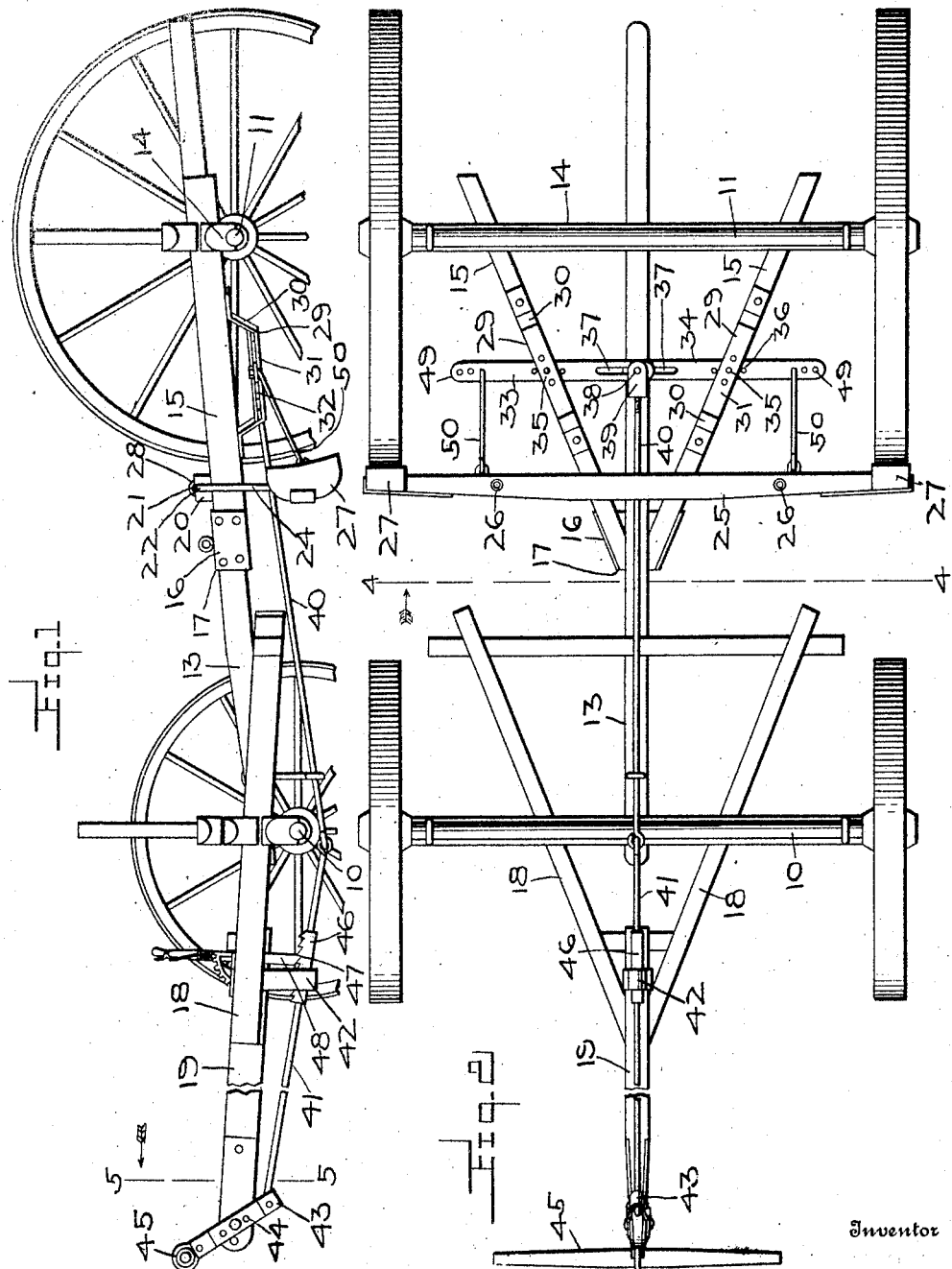

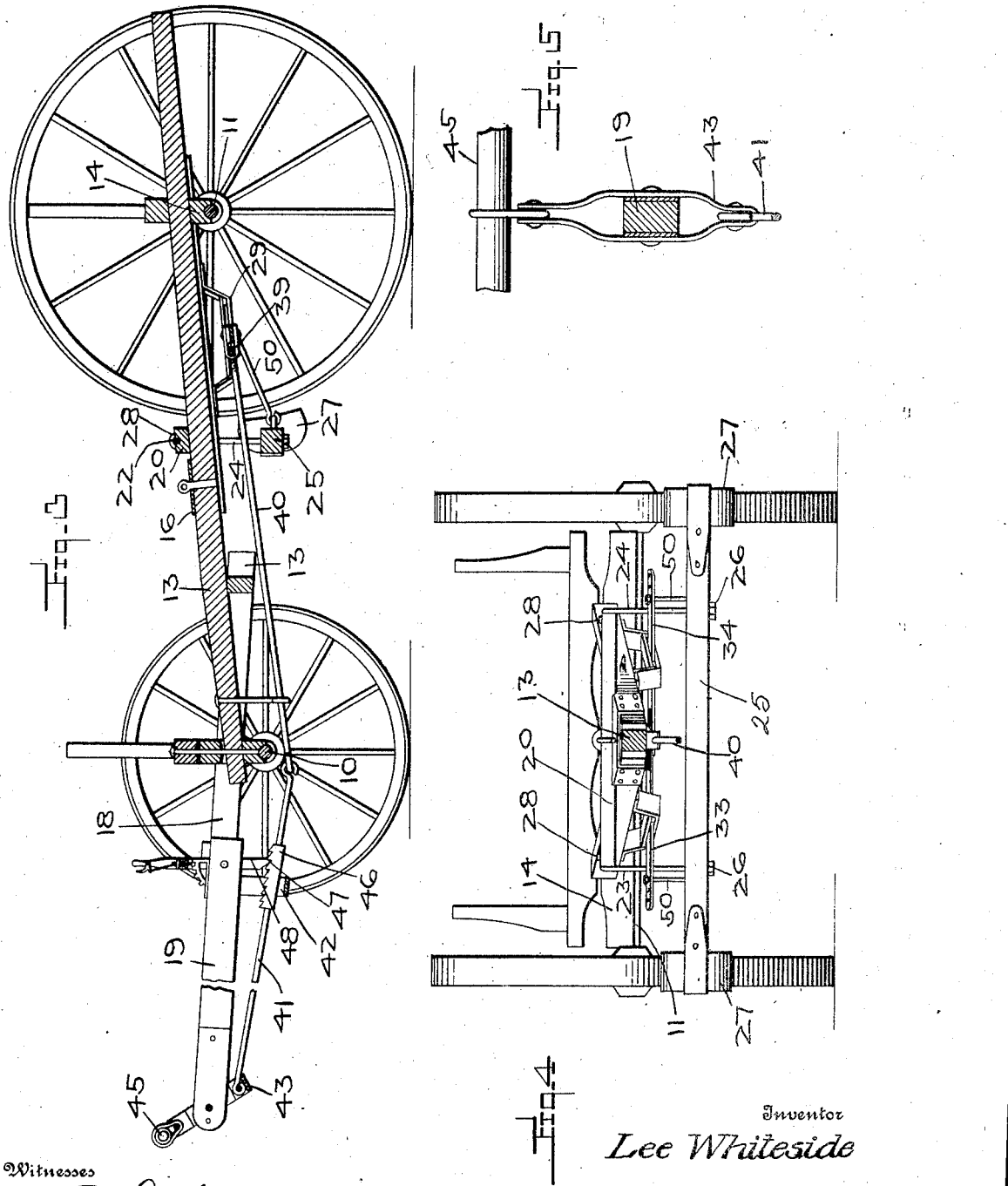

LEE WHITESIDE, OF LATTIMORE, NORTH CAROLINA.

VEHICLE-BRAKE.

No. 905,396.

Specification of Letters Patent.

Patented Dec. 1, 1908.

Application filed March 30, 1908. Serial No. 424,220.

*To all whom it may concern:*

Be it known that I, LEE WHITESIDE, a citizen of the United States, residing at Lattimore, in the county of Cleveland and State of North Carolina, have invented certain new and useful Improvements in Vehicle-Brakes, of which the following is a specification.

This invention relates to the class of carriages and wagons, and more particularly to vehicle brakes and has for an object to provide a brake which will be automatic in action and which will be effectively applied to the rear wheels of a vehicle during its travel down grade.

Other objects and advantages will be apparent from the following description and it will be understood that changes in the specific structure shown and described may be made within the scope of the claims without departing from the spirit of the invention.

In the drawings forming a portion of this specification and in which like numerals of reference indicate similar parts in the several views, Figure 1 is a side elevational view of a vehicle showing the application of the present invention thereto, Fig. 2 is a bottom plan view, Fig. 3 is a longitudinal sectional view through the draft pole showing the manner of attaching a brake rod thereto. Fig. 4 is a transverse sectional view through the brake beam. Fig. 5 is a detail vertical sectional view on the line 5—5 of Fig. 1.

Referring now more particularly to the drawings, there is shown a vehicle consisting of the usual front and rear axles 10 and 11 respectively provided with ground wheels of ordinary construction, and these axles are connected by a center pole 13. The rear axle is provided with the usual bolster 14 as shown, and this bolster and axle respectively receive the inner ends of hounds 15 connected at their forward ends by a metallic plate 16 to the center pole as shown at 17. The front axle is provided with similar hounds 18 which carry at their forward ends a draft pole 19.

The center pole is provided with a transversely extending beam 20 located slightly in advance of the forward edges of the rear wheels of the vehicle, and this beam is grooved upon its upper edge as shown at 21 and thus receives a transversely extending rod 22. The rod 22 is provided with depending portions 23 and 24 respectively which have their lower ends disposed in vertical passages formed in a brake beam 25. The rods are preferably threaded at their lower ends and receive nuts 26 engaged beneath the brake beam, as shown. The ends of the brake beam are provided with shoes 27 for engagement with the rear wheels of the vehicle as will be hereinafter set forth. The rod 21 is secured to the beam 20 by means of staples or similar fastening devices 28 and it will thus be seen that the rod 22 is mounted for rocking movement to bring its brake beam toward and away from the rear wheels of the vehicle.

The hounds 15 are provided with brackets 29, and these brackets are provided with depending portions 30 which are connected by a horizontally disposed portion 31 which is thus arranged in spaced relation to the hounds. The portion 31 is provided with a longitudinally extending slot 32, and these brackets are thus arranged to receive links 33 and 34 respectively pivoted between the walls of the slots as shown at 35. The links, at their centers, are each provided with a plurality of vertical passages 36 whereby the links are adjustably connected.

At their inner ends, the links are provided with elongated slots 37 which receive a vertically disposed pin 38 carried by the leg members 39 of the forked end of a rod 40 which is slidable in brackets beneath the pole 13, and this rod is connected at its front end to a brake rod 41 slidable in a bracket 42 depending from the draft pole.

The rod 41 at its forward end is pivotally connected to a member 43 which is pivotally connected to the pole 19 at the forward end thereof. The member 43 is provided with a plurality of adjusting openings 44, and at the upper end this member is provided with a neckyoke 45. The rod 41 rearwardly of the member 43 is provided with a rack bar 46 having a plurality of transversely extending rack teeth 47 arranged to receive the lower end of a pivoted stop 48 carried by the draft pole 19.

The links 33 and 34 respectively at their outer ends are provided with a series of adjusting openings 49 arranged to receive the rear ends of rods 50 pivotally connected at their forward ends to the brake beam 25, as shown.

It will thus be seen that upon movement of the vehicle down grade, that the horses or draft animals in their tendency to hold back the load will carry the neckyoke in a rearward direction, thus operating the brake rods as is obvious, which, in turn, will control the links 33 and 34 respectively to effectively apply the brake shoes to the rear wheels of the vehicle. The provision of the stop which is engaged at its lower end with the teeth of the brake rod is such that the brake shoes are held disengaged from the wheels during backing of the vehicle until the stop has been released, which may be conveniently effected by the foot of the driver.

What is claimed is:

1. The combination with a vehicle including rearward hounds, of depending brackets carried by the hounds, a center pole located between the hounds, a transverse member secured upon the hounds and upon the center pole, a rod mounted upon the transverse member for rocking movement, said rod having depending end portions, a brake beam secured to the depending end portions of the rod, brake shoes carried by the brake beam, a normally transversely extending link pivoted in each bracket, a rod pivoted to the outer end of each link, said rods being pivotally connected with the brake beam, said links being provided with longitudinal slots at their inner portions and being overlapped, a pin slidably engaged in the slots, a rod having a forked end pivotally engaged with the pin, said rod extending forwardly, a depending bracket carried by the draft pole, a rod pivoted at its rear end to the forward end of the first named rod, said second named rod extending through the bracket and having upwardly directed rack teeth, a pivoted stop carried by the draft pole and arranged for engagement with the rack teeth to hold the second named rod at different points of its movement, a member pivoted for movement in a vertical plane to the forward end of the draft pole, and a neck yoke pivotally connected with the upper portion of the member, said second named rod being pivotally connected with the lower portion of the said member.

2. The combination with a vehicle including a draft pole, front and rear axles connected with the center pole, wheels carried by the axles and rearwardly divergent hounds connected with the center pole at their forward ends and with the rear axle at their rearward portion, of depending brackets secured to the hounds, a normally transversely extending link pivoted at each bracket for movement in a horizontal plane, said links being overlapped at their inner portions and having registering longitudinal slots, a longitudinally extending rod slidable connected with the center pole, and having a forked rearward end disposed with its spaced portions above and below the overlapping portions of the links, a pin engaged in said spaced portions and in the slots of the links, a brake beam pivotally connected with the rearward hounds and with the center pole for movement toward and away from the rear wheels, brake shoes carried by the brake beam and arranged for engagement of the rear wheels, rods pivotally connected with the brake beam and with the outer end portions of the links, a vertically extending pivoted member carried by the forward portion of the draft pole, said pivoted member extending above and below the draft pole, a rod pivotally connected with the first named longitudinally extending rod and with the lower portion of the pivoted member, and means for holding the second named rod at different points of its longitudinal movement, said vertical member being arranged for attachment of the neck yoke to its upper portion.

In testimony whereof I affix my signature, in presence of two witnesses.

LEE WHITESIDE.

Witnesses:
R. P. EARLY,
W. B. GETTYS.